Patented Aug. 1, 1944

2,354,775

UNITED STATES PATENT OFFICE 2,354,775

TERPENE RESIN

Alfred L. Rummelsburg, Wilmington, Del., assignor to Hercules Powder Company, Wilmington, Del., a corporation of Delaware No Drawing. Application June 14, 1941, Serial No. 398,109

22 Claims. (Cl. 260—80)

This invention relates to resinous products which result from the copolymerization of a terpene with a halide of an unsaturated hydrocarbon.

When terpenes are subjected to conditions of polymerization, products result which are resinous in nature and which vary in physical characteristics from viscous oils to soft resins at room temperature. For example, when dipentene or a terpinene, dissolved in ethylene dichloride, is contacted with catalysts, such as, boron trifluoride, aluminum chloride, etc., for a period of 27 hours and at a temperature of 0° C. to 5° C., a polymerized product results which is a viscous oil. Various other catalysts and conditions for the polymerization may be employed. Generally, however, it has been found impossible to produce appreciable yields of resins having drop melting points above 50° C. This condition is quite a disadvantage in connection with the use of these terpene polymers in protective coating compositions. Another disadvantage rests in the fact that the use of terpene polymers contributes poor drying properties to the coating compositions. While the use of these polymers as substitutes for ester gum give improved resistance to discoloration under ultra-violet light and improved gasproofness, etc., to protective coating compositions, the drying properties of the coating compositions are so inferior that they constitute a serious impediment to their commercial acceptability.

Generally, when a terpene or a mixture of terpenes is subjected to conditions which are conducive to polymerization, the polymers formed are of very low order or degree. Actually, the polymers formed are usually the dimer, the trimer and the tetramer along with small amounts of higher polymers. The dimer will usually be found to predominate over the other polymers formed. The significant fact is that the average degree or order of polymerization will be rather low. For example, the average degree of polymerization may vary between 2.0 and about 4.0. These values, it will be understood are based on polymerizates which have been treated to remove substantially all of the unpolymerized constituents. In other words, the polymerizates will consist substantially entirely of the dimer, trimer, etc., of the constituent or constituents being polymerized with substantially none of the monomer being present.

It is an object of this invention to provide new resinous products which possess generally higher viscosities or melting points, as the case may be, as compared with terpene polymers prepared under similar conditions. It is a further particular object of the invention to provide new resinous products which are solid at room temperature.

It is a further object to provide terpene-containing resinous copolymers which are characterized by their having a relatively high degree of polymerization when compared with the terpene-containing polymers of the prior art.

Also, it is an object to provide resinous copolymers which contain reactive positions which in turn make possible the substitution of other groups in the copolymer molecules.

An additional object is to provide resinous products which when incorporated into protective coatings will yield protective films having good drying characteristics. It is particularly desired to provide protective coatings having improved characteristics over protective coatings containing terpene polymers.

Other objects will appear hereinafter.

It has been found, in accordance with this invention, that various terpenes or mixtures thereof may be copolymerized with various compounds having the following general formula:

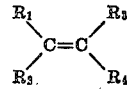

where $R_1$ is hydrogen, methyl, chlorine or bromine; $R_2$ is chlorine, bromine, the chloromethyl or the bromomethyl radical; $R_3$ is hydrogen or methyl; $R_4$ is hydrogen or methyl; and where no additional halogen is present when a chloromethyl or bromomethyl radical is present. The polymerization will be carried out in the presence of a suitable catalyst and under suitable operating conditions to yield resinous materials which have many distinguishing characteristics over the resinous polymers of terpenes or mixtures thereof. These new copolymers are unusual in that they possess generally higher viscosities or melting points, as the case may be, than the resinous polymers produced by the polymerization of terpenes or terpene mixtures. Thus, it is possible in accordance with this invention to prepare products which are viscous liquids or solids which have drop melting points of from about 20° C. up to about 160° C., preferably, between about 50° C. and about 160° C. The average degree of polymerization will be found to be substantially higher than that of products resulting when terpenes or terpene mixtures are polymerized under similar conditions. In addition, the protective coating compositions containing the copolymer resins of this invention have improved drying characteristics, particularly when compared with those of compositions prepared from terpene polymers.

It will be noted that the compounds of the general formula hereinabove set out can be classified as halides of unsaturated hydrocarbons. Any unsaturated hydrocarbon halide having such general formula may be employed as one of the constituents of the mixture which is submitted to conditions of polymerization in accordance with this invention. For example, vinyl chloride, vinyl bromide, vinylidene chlorine, vinylidene bromide, 1-bromo-1-chloro ethylene, allyl chloride, methallyl chloride (1-chloro-2-methyl-2-propene), crotyl chloride, 2-chloro-2-butene, isocrotyl chloride (1-chloro-2-methyl-1-propene), etc., may be employed. Although any of these compounds may be employed, it is preferred to employ vinyl chloride, vinyl bromide, vinylidene chloride or vinylidene bromide. If desired, a mixture of several of the above compounds may be employed in the copolymerization with a desired terpene.

Any terpene hydrocarbon having the empirical formula $C_{10}H_{16}$, or a mixture of such terpenes, may be copolymerized with a suitable halide of an unsaturated hydrocarbon as hereinbefore described to produce new resinous products in accordance with the invention. Thus, for example, I may employ acylic terpenes, such as, myrcene, ocimene, allo-ocimene, cryptotaenene, etc.; monocyclic terpenes, such as, dipentene, alpha-terpinene, beta-terpinene, gamma-terpinene, terpinolene, sylvestrene, alpha-phellandrene, beta-phellandrene, origanene, the pyronenes, etc.; bicyclic terpenes, such as, alpha-thujene, beta-thujene, sabinene, the carenes, alpha-pinene, beta-pinene, camphene, bornylene, alpha-fenchene, beta-fenchene, gamma-fenchene, etc.

In place of pure terpenes or their synthetic mixtures, it is possible to employ natural terpene mixtures. Thus, for example, it is possible to employ either wood or gum turpentine. Wood turpentine consists primarily of alpha-pinene, whereas gum turpentine, depending upon its source, will contain varying proportions of alpha- and beta-pinene. Other fractions containing crude mixtures of various terpenes and obtained as a result of the recovery of oleoresinous materials from pine wood may be employed. One such commercially available terpene-containing mixture is known as "Solvenol." This particular mixture contains the monocyclic terpene hydrocarbons, terpinene, terpinolene and dipentene. Other terpene mixtures which may be employed are those obtained in the heat isomerization of alpha- and/or beta-pinene. When, for example, alpha-pinene is heated at elevated temperatures, it is possible to obtain products containing as much as 40% allo-ocimene along with substantial amounts of alpha-pinene, dipentene and other complex terpene products. Suitable pyrolysis of beta-pinene yields myrcene together with various monocyclic terpenes. Still further, it is possible to employ terpene mixtures obtained in the synthesis of ethers and alcohols from alpha- and beta-pinene.

In accordance with the present invention, a mixture of a terpene and a halide of an unsaturated hydrocarbon having the above general formula, desirably in the presence of an inert solvent, is contacted with a polymerization or condensation catalyst at a temperature which promotes the copolymerization of the constituents for a period sufficiently long to secure a substantial yield of copolymerized product. Desirably, the reaction mixture will be vigorously agitated throughout the period of contact of the reactants with the catalyst.

The polymerization catalysts which will be employed in accordance with this invention can be categorized into four distinct groups. These groups comprise the metal halides, such as, boron trifluoride and its molecular complexes with ethers and acids, titanium chloride, ferric chloride, and the halides of metals whose hydroxides are amphoteric, as aluminum chloride, stannic chloride, zinc chloride, etc.; acids, such as, hydrofluoric acid, fluoroboric acid, polybasic mineral acids, as orthophosphoric acid, tetraphosphoric acid, sulfuric acid, etc., acyl sulfuric acids, as acetyl sulfuric acid, alkyl sulfuric acids, as ethyl sulfuric acid, para-toluene sulfonic acid, etc.; activated clays, such as fuller's earth, diatomaceous earth, alumina, bauxite, synthetic magnesium silicates, etc.; peroxide catalysts, such as, benzoyl peroxide, acetyl peroxide, etc. For the acid catalysts, certain of their anhydrides, for example, phosphorus pentoxide, if they are available, may be equivalently employed. The activated clays will desirably be calcined at temperatures of, for example, from 100° C. to 500° C. prior to use.

It will be realized that the operable ranges for the catalyst to reactant ratio, reaction temperature, and reaction period, beyond which no reaction takes place are very wide and cannot be precisely ascertained. This results from the fact that with certain catalysts, notably the peroxide type, minute quantities are responsible for some definite reaction even though it be small. However, as a practical matter, the operable limits have been ascertained beyond which it would not be economically desirable to operate. Hence, generally, in accordance with the invention, the catalyst to reactant ratio may vary between about 0.001 and about 1.0. The operable temperatures may vary from about −60° C. to about 200° C., and the operable reaction period will vary from about 1 to about 400 hours. Moreover, it is preferred when a metal halide or acid catalyst is employed, to use a catalyst to reactant ratio between about 0.02 and about 1.0, a reaction temperature between about −20° C. and about 80° C., and a reaction period between about 2 hours and about 24 hours. When an activated clay is employed as the catalyst, it is preferred to use a catalyst to reactant ratio between about 0.05 and about 0.25, a reaction temperature between about 80° C. and about 200° C., and a reaction period between about 6 and about 8 hours. When a peroxide catalyst is used, it is preferred to employ a catalyst to reactant ratio between about 0.001 and about 0.01, a reaction temperature between about 50° C. and about 150° C. and a reaction period between about 48 and about 400 hours. It has furthermore been found that peroxide catalysts are only operable when vinyl chloride, vinyl bromide, vinylidene chloride, or vinylidene bromide are employed in the copolymerization. Even when these particular compounds are employed, it is preferred that the ratio of unsaturated halide to terpene is greater than 1.0.

In accordance with this invention, the metal halide catalysts are preferred where the object is the production of resinous copolymers which are solid at room temperature. It is further preferred that the metal halide catalyst be employed in conjunction with a halogenated inert solvent for the reactants. It has been found that when a metal halide catalyst is employed for the copolymerization in conjunction with an inert solvent, employing a catalyst to reactant ratio, a temperature and a reaction period within the broad operable ranges disclosed hereinabove, generally, solid polymers will result. It will be understood, however, that although metal halides are preferably employed in producing resinous copolymers which are solid at room temperature in accordance with this invention, it is quite possible that solid polymers may result from the employment of the other catalysts disclosed herein.

The ratio of terpene to halide of an unsaturated hydrocarbon which will be employed in accordance with this invention may vary widely depending upon the particular compounds under consideration and the desired properties of the resulting product. Generally, however, it is preferred to employ the terpene in an amount between about 5% and about 95% of the total weight of the reactants, with the halide of an unsaturated hydrocarbon being employed in a corresponding amount of between about 95% and about 5% of the total weight of the reactants. As the proportion of unsaturated hydrocarbon halide is increased, the resulting copolymers will tend to have heavier viscosities or higher melting points as the case may be.

The inert solvents which may be employed in accordance with this invention generally comprise any organic liquid which is inert to the reactants and catalyst employed. Thus, aliphatic hydrocarbons, such as, gasoline, petroleum naphtha, butane, pentane, etc.; aromatic hydrocarbons, such as, benzene, toluene, xylene, etc.; cyclic hydrocarbons, such as, cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, methylene chloride, etc., may be employed. In conjunction with the use of metal halide catalysts, the halogenated hydrocarbon and the aromatic hydrocarbon solvents are preferred, with the halogenated hydrocarbons, such as ethyl chloride and ethylene chloride, being most preferred.

Following the reaction period, employing the conditions as hereinabove described, the reaction mixture is suitably treated to recover the copolymerization product as determined by the particular procedure employed in accomplishing the reaction. Thus, when a metal halide or acid catalyst has been employed, the catalyst may be removed by washing the reaction mixture with water or an aqueous alkali or an aqueous inorganic acid. The aqueous acid wash often facilitates the removal of metal halide catalysts from the reaction mixture since it greatly assists in decomposing complexes which the catalyst has formed with unsaturated centers of the materials with which it has come in contact. Following the alkali or acid wash, it is desirable to wash with water to remove all traces of alkali or acid. The solvent, if one has been used, and any unreacted constituents are removed, desirably by means of vacuum distillation using, if necessary, a final bath temperature of about 140 to 220° C. An alternative method for recovery of the copolymer after the catalyst has been removed is to dilute the reaction mixture with an organic liquid which is miscible with the inert solvent employed in the reaction but in which the copolymer is insoluble. After vigorous agitation, the copolymer is precipitated from the solution, often in the form of a powder or granules. For example, ethyl alcohol or acetone may be so employed with many of the copolymers prepared in accordance with this invention.

When an activated clay has been employed in accordance with this invention, its removal may be accomplished after the reaction is complete by means of filtration. When peroxide catalysts are employed, they decompose during the reaction, so their removal raises no problem.

The color of the final products may be improved by utilizing terpenes which have been distilled from caustic. Also, the use of an inert atmosphere such as $CO_2$, $N_2$, etc., during the reaction period leads to the production of pale colored products. Further refinement of the products may be accomplished by treatment with adsorbents such as silica gel, fuller's earth, bauxite, activated carbon, activated magnesium and aluminum silicates, etc. This treatment removes traces of combined catalysts and further bleaches the products. It may be applied either before or after removal of the solvent. Other refining agents which may be employed include selective solvents, such as, furfural, furfuryl alcohol, phenol, etc. If desired, the copolymer resins obtained in accordance with the processes described herein may be subjected to vacuum distillation to remove volatile copolymers, leaving copolymer residues having higher melting points than the initial copolymerization product.

There follow several specific examples which illustrate particular embodiments of the principles of this invention which, however, are in no way to be construed as being limiting. All parts and percentages in this specification and claims are by weight unless otherwise indicated.

*Example 1*

Five parts of beta-pinene and 5 parts of vinyl chloride were dissolved in 15 parts of ethyl chloride. The solution was cooled to −50° C. to −70° C. by means of a dry ice-acetone bath. The solution was agitated and held within said temperature range while 1.5 parts of anhydrous aluminum chloride were added over a period of 10 minutes. Agitation was continued for 0.5 hour at a temperature within said temperature range. The reaction mixture was then added to 400 parts of 95% ethyl alcohol with vigorous agitation. A precipitate formed which was filtered off and washed with additional 95% ethyl alcohol and dried in vacuo. Seven parts of copolymer resin resulted in the form of a white powder, having a drop melting point of 110° C. and a chlorine content of 4.4%.

*Example 2*

The previous example was duplicated with the exception that the beta-pinene was replaced with dipentene. The dipentene employed contained approximately 25% cymene as an impurity. There resulted 3 parts of copolymer resin in the form of a white powder, having a drop melting point of 100° C. and a chlorine content of 1.0%.

*Example 3*

One hundred parts of wood turpentine and 40 parts of vinylidene chloride were dissolved in 200 parts of ethylene dichloride. The wood turpentine employed was purified prior to use by steam distillation over caustic. The resulting solution was cooled to 10° C., then 10 parts of anhydrous aluminum chloride were added over a period of 1 hour with vigorous agitation at 5° C. to 10° C. Agitation was continued for 0.5 hour at 10° C. The homogeneous reaction mixture was then allowed to stand for 42 hours at 0° C. to 3° C. Thereafter, the reaction mixture was washed with 1185 parts of aqueous 25% sulfuric acid having a temperature of 60° C. The reaction mixture was then steam distilled from about 1000 parts of aqueous 10% sulfuric acid in order to remove the ethylene dichloride and any unreacted constituents. The residue from the steam distillation was diluted with 200 parts of toluene, and the resulting solution was thoroughly water washed. The toluene and additional unreacted constituents were then removed by vacuum distillation, using a final bath temperature of 200° C. and a pressure of 15 mm. The copolymer resin resulting was obtained in the amount of 90 parts, having a color of K on the rosin scale, a drop melting point of 70° C. and a chlorine content of 0.9%.

*Example 4*

Example 3 was duplicated exactly with the exception that the ethylene dichloride was replaced by toluene. Following the reaction period, the toluene solution was washed with 1185 parts of aqueous 25% sulfuric acid and then with water. The toluene and unreacted constituents were removed by vacuum distillation, using a final bath temperature of 200° C. and a pressure of 15 mm. There resulted 100 parts of copolymer resin, having a color of N on the rosin scale, a drop melting point of 60° C. and a chlorine content of 1.0%.

*Example 5*

One hundred parts of Solvenol, a terpene mixture containing 75% dipentene and 25% other monocyclic terpenes, and 40 parts of vinylidene chloride were dissolved in 200 parts of ethylene dichloride. The solution was cooled to 10° C., and 10 parts of anhydrous aluminum chloride were added over a period of 1 hour with vigorous agitation at 5° C. to 10° C. Agitation was then continued for 0.5 hour at 10° C. The reaction mixture was then allowed to stand for 91 hours at 0° C. to 3° C. The reaction mixture was washed with 1185 parts of aqueous 25% sulfuric acid having a temperature of 60° C. The reaction mixture was then steam distilled from about 1000 parts of aqueous 10% sulfuric acid in order to remove the ethylene dichloride and any unreacted constituents. The residue from the steam distillation was dissolved in 290 parts of toluene, and the resulting solution was thoroughly water washed. The toluene and additional unreacted constituents were removed by vacuum distillation, using a final bath temperature of 200° C. and a pressure of 15 mm. The copolymer resin which resulted in the amount of 50 parts was a viscous liquid having a color of WG on the rosin scale and a chlorine content of 2.3%.

*Example 6*

Fifty parts of wood turpentine and 25 parts of methallyl chloride (1-chloro-2-methyl-2-propene) were dissolved in 200 parts of ethylene dichloride and the solution cooled to 5° C. to 10° C. Four parts of anhydrous aluminum chloride were added with vigorous agitation over a period of 0.5 hour while maintaining the temperature of the reaction mixture between 5° C. and 15° C. Agitation was continued for 1.0 hour at 5° C. to 10° C. The reaction mixture was allowed to stand at 0° C. to 3° C. for a period of 21 hours. The ethylene dichloride and unreacted constituents were then removed by steam distillation over aqueous 10% sulfuric acid. The residue was dissolved in 190 parts of toluene, and the toluene solution was thoroughly water washed. The toluene and additional unreacted constituents were removed by vacuum distillation, using a final bath temperature of 200° C. and a pressure of 15 mm. Forty-seven parts of copolymer resin resulted, having a drop melting point of 75° C., a color of I on the rosin scale and a chlorine content of 3.6%.

*Example 7*

Following the same procedure as that employed in Example 6 with the exception that the methyllyl chloride was replaced by allyl chloride, there resulted 47 parts of copolymer resin, having a drop melting point of 70° C., a color of N on the rosin scale and a chlorine content of 3.1%.

The instant copolymers are of particular significance when compared with the prior art terpene polymers in that they have reactive positions in their molecular structure not present in the prior art polymers. The halides present are meant specifically. Thus, it is possible to introduce various functional groups, such as, amino, thiocyano, alkoxy, acyl, etc., by virtue of substitution reactions. In this manner derivatives of increased utility suitable for particular usage may be obtained.

Solvents for these copolymer resins comprise benzene, toluene, chlorinated hydrocarbons, petroleum hydrocarbons, turpentine, drying oils, etc. The resins, however, are only slightly soluble in ethyl alcohol and in acetone.

The films formed by the copolymer resins of this invention adhere well to various surfaces, such as, wood, glass, paper, metal, etc. Many of the copolymers give films having improved flexibility in comparison with terpene polymers. Hence, these resins are very useful in the form of their clear solutions in the lacquer, varnish and adhesive fields. They may also be used in the formulation of pigmented coating compositions, such as, paints and pigmented lacquers for wood, metal, paper, etc. Unpigmented solutions or emulsions of the copolymer resins are suitable for impregnating or coating paper, textiles, fibers, wood, etc.

It will be understood that wherever in this specification reference is made to the melting point of a resinous material, a melting point as determined by the Hercules drop method is contemplated.

It will be understood that the details and examples hereinbefore set forth are illustrative only and that the invention as broadly described and claimed is in no way limited thereby.

What I claim and desire to protect by Letters Patent is:

1. A resinous product of the copolymerization of a terpene and a material having the general formula:

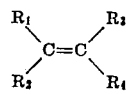

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present.

2. A resinous product of the copolymerization of a monocyclic terpene and a material having the general formula:

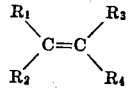

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present.

3. A resinous product of the copolymerization of a bicyclic terpene and a material having the general formula:

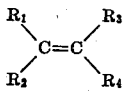

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present.

4. A resinous product of the copolymerization of a monocyclic terpene and vinyl chloride.

5. A resinous product of the copolymerization of a bicyclic terpene and vinylidene chloride.

6. A resinous product of the copolymerization of a bicyclic terpene and vinyl chloride.

7. A resinous product of the copolymerization of dipentene and vinyl chloride.

8. A resinous product of the copolymerization of turpentine and vinylidene chloride.

9. A resinous product of the copolymerization of beta-pinene and vinyl chloride.

10. The process which comprises copolymerizing a mixture of a terpene and an unsaturated material having the general formula:

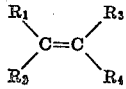

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, at a temperature between about −60° C. and about 200° C. in the presence of a catalyst capable of polymerizing the mixture and active at the polymerization temperature.

11. The process which comprises copolymerizing a mixture of a terpene and an unsaturated material having the general formula:

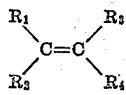

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, at a temperature between about −60° C. and about 200° C. in the presence of a metal halide catalyst capable of polymerizing the mixture and active at the polymerization temperature.

12. The process which comprises copolymerizing a mixture of a terpene and an unsaturated material having the general formula:

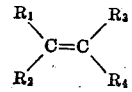

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, at a temperature between about −20° C. and about 80° C. in the presence of a metal halide catalyst capable of polymerizing the mixture and active at the polymerization temperature.

13. The process which comprises copolymerizing a mixture of a terpene and an unsaturated material having the general formula:

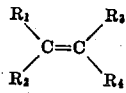

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, both of which reactants are dissolved in an inert solvent, at a temperature between about −20° C. and about 80° C. in the presence of a metal halide catalyst capable of polymerizing the mixture and active at the polymerization temperature.

14. The process which comprises copolymerizing a mixture of a terpene and an unsaturated material having the general formula:

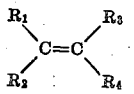

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, both of which reactants are dissolved in an inert halogenated solvent, at a temperature between about −20° C. and about 80° C. in the presence of a metal halide catalyst capable of polymerizing the mixture and active at the polymerization temperature.

15. The process which comprises copolymerizing a mixture of a terpene and an unsaturated material having the general formula:

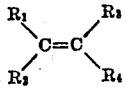

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, at a temperature between about $-60°$ C. and about $200°$ C. in the presence of an acid catalyst capable of polymerizing the mixture and active at the polymerization temperature.

16. The process which comprises copolymerizing a mixture of a terpene and an unsaturated material having the general formula:

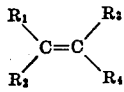

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, at a temperature between about $-20°$ C. and about $80°$ C. in the presence of an acid catalyst capable of polymerizing the mixture and active at the polymerization temperature.

17. The process which comprises copolymerizing a mixture of a terpene and an unsaturated material having the general formula:

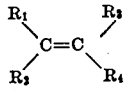

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, in the presence of an activated clay as a polymerization catalyst, at a temperature between about $-60°$ C. and about $200°$ C.

18. The process which comprises copolymerizing a mixture of a terpene and an unsaturated material having the general formula:

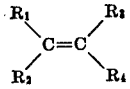

where $R_1$ is a member of the group consisting of hydrogen, methyl, chlorine, and bromine; $R_2$ is a member of the group consisting of chlorine, bromine, the chloromethyl and the bromomethyl radicals; $R_3$ is a member of the group consisting of hydrogen and methyl; $R_4$ is a member of the group consisting of hydrogen and methyl; and where no additional halogen is present when a halomethyl group is present, in the presence of an activated clay as a polymerization catalyst, at a temperature between about $80°$ C. and about $200°$ C.

19. The process which comprises copolymerizing a mixture of a monocyclic terpene and vinyl chloride, at a temperature between about $-60°$ C. and about $200°$ C. in the presence of a catalyst capable of polymerizing the mixture and active at the polymerization temperature.

20. The process which comprises copolymerizing a mixture of a bicyclic terpene and vinylidene chloride, at a temperature of between about $-60°$ C. and about $200°$ C. in the presence of a catalyst capable of polymerizing the mixture and active at the polymerization temperature.

21. The process which comprises copolymerizing a mixture of turpentine and vinylidene chloride at a temperature of between about $-60°$ C. and about $200°$ C. in the presence of a catalyst capable of polymerizing the mixture and active at the polymerization temperature.

22. The process which comprises copolymerizing a mixture of beta-pinene and vinyl chloride at a temperature af between about $-60°$ C. and about $200°$ C. in the presence of a catalyst capable of polymerizing the mixture and active at the polymerization temperature.

ALFRED L. RUMMELSBURG.